2,962,514
p-SUBSTITUTED BENZENESULFONYL CYCLOPROPANE INTERMEDIATE

John A. Carbon, William B. Martin, and Leo R. Swett, Waukegan, Ill., assignor to Abbott Laboratories, Chicago, Ill., a corporation of Illinois No Drawing. Filed July 7, 1958, Ser. No. 746,600

4 Claims. (Cl. 260—456)

This invention relates to novel compounds and to a process for their preparation.

The compounds prepared by the process hereafter disclosed are methylenecyclopropanemethyl p-substituted benzenesulfonates which are structurally presented as:

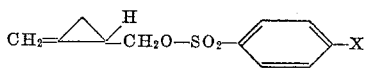

Where X is loweralkyl, halogen or nitro.

These compounds are useful as chemical intermediates in the preparation of a compound which is orally effective as a hypoglycemic agent; this is, a compound which reduces blood sugar.

The compounds of this invention are prepared by reacting methylenecyclopropanemethanol with a p-substituted benzenesulfonyl halide in the presence of a catalytic solvent. The starting methylenecyclopropanemethanol is prepared by reducing a loweralkyl methylenecyclopropanecarboxylate, as more fully disclosed in co-pending application, Serial No. 746,636, filed of even date herewith, now U.S. Patent 2,921,966. The loweralkyl methylenecyclopropanecarboxylate is prepared by refluxing a loweralkyl-2-halo-2-methylcyclopropanecarboxylate in the presence of a metal hydride, as disclosed more fully in co-pending application, Serial No. 746,638, filed of even date herewith. The halo cyclopropanecarboxylate is prepared by reacting an unsaturated haloalkyl with a loweralkyl diazoacetate according to the manner disclosed in co-pending application, Serial No. 746,635, filed of even date herewith. The compounds of this invention are subsequently treated with a loweralkyl formamidomalonate to form a diloweralkylformamido-(methylenecyclopropylmethyl)malonate, and said malonate is thereafter hydrolyzed and decarboxylated to obtain the active hypoglycemic agent, α-amino-methylenecyclopropanepropionic acid or hypoglycin A, as disclosed in greater detail in co-pending application, Serial No. 746,637, filed of even date herewith.

Hypoglycin A is one of the components extracted from the fruit *Blighia sapida*. This fruit is commonly known as Ackee. A second hypoglycemic component present in said fruit is known as hypoglycin B. Hypoglycin A has been widely investigated regarding its pharmacological and chemical properties. Physical and chemical constants of hypoglycin A and its hypoglycemic activity have been described by C. H. Hassall and K. Reyle in "Biochem. Journ.," volume 60, page 324 (1955) and "Nature," volume 173, page 356 (1954). The chemical structure of hypoglycin A was definitely established by C. V. Holt and W. Leppla in "Angewandte Chemie," volume 70, page 25 (1958).

The novel compound of this invention is prepared by reacting methylenecyclopropanemethanol with a p-substituted benzenesulfonyl halide; that is, a halide of a sulfonic acid of the following type:

OH—SO$_2$—R

Where R is loweralkyl aryl, p-loweralkyl aryl, p-haloaryl and p-nitroaryl. Specific sulfonic acids operable in this invention are: p-toluenesulfonic acid, p-bromobenzenesulfonic acid, p-nitrobenzenesulfonic acid and the like. The halides of the foregoing acids operable in the process are the chloride, bromide and fluoride members of the halogen class. The novel compounds comprise a sulfonic acid ester of methylenecyclopropanemethanol. The catalytic solvent employed in this invention may be 2, 4, 6-collidine, pyridine and the like. The p-toluenesulfonic acid chloride is the preferred reactant and 2, 4, 6-collidine is the preferred reagent.

The following examples are presented as an embodiment of the process which produces the novel compound. It is not intended that said examples be exclusive illustrations of the reagents and reaction recited therein.

EXAMPLE I

*Methylenecyclopropanemethyl p-toluenesulfonate*

Methylenecyclopropanemethanol (4.0 gms.; 0.048 mole) is dissolved in 30 ml. of re-distilled, dry 2, 4, 6-collidine and cooled to −5° in an ice-salt bath. To this solution is added p-toluenesulfonyl chloride (9.9 gms.; 0.052 mole) and the mixture is swirled until the tosyl halide is completely dissolved. The mixture is kept at −5° to 0° C. for two hours. The semi-solid reaction mixture is liquefied by the addition of 5 ml. of water and then poured into crushed ice containing 30 ml. of 20% sulfuric acid. The insoluble oil is extracted with chloroform, the chloroform extracts are first washed with two small portions of 5% sulfuric acid, then with water and finally dried over anhydrous potassium carbonate. The chloroform is removed in vacuo at 30° C. to leave 7.1 gms. (63%) of methylenecyclopropylmethyl p-toluenesulfonate.

EXAMPLE II

*Methylenecyclopropanemethyl p-bromobenzenesulfonate*

Methylenecyclopropanemethanol (2.0 gms.; 0.024 mole) is dissolved in 20 ml. of re-distilled, dry 2, 4, 6-collidine and cooled to 0° in an ice-bath. To this solution is added p-bromobenzenesulfonyl chloride (6.66 gms.; 0.026 mole), and the mixture is swirled until all the p-bromobenzenesulfonyl chloride is dissolved. The mixture is kept at 0° C. for two hours, then at 4° C. (cold room) overnight. The mixture is liquefied by the addition of 5 ml. of water and then poured into crushed ice containing 20 ml. of 20% sulfuric acid. The solid product is extracted with chloroform (two portions), the extracts are first washed with 10% sulfuric acid and then with water and finally dried over anhydrous magnesium sulfate. After removal of the chloroform in vacuo at 30–35° C., the partly crystalline brown residue is extracted with about 10 ml. of warm Skelly B solvent, decanted from a small quantity of insoluble black tar, and cooled slowly to 0° C. The product separates as colorless hexagonal prisms (4.7 gms.; 65%), M.P.=54.0–54.5° C.

*Anal.*—Calcd. For C$_{11}$H$_{11}$BrO$_3$S. Calculated: C, 43.57%; H, 3.66%; Br, 26.35%. Found: C, 43.66%; H, 3.75%; Br, 26.47%.

EXAMPLE III

*Methylenecyclopropanemethyl p-nitrobenzenesulfonate*

Following the procedure set out in Example I, methylenecyclopropanemethanol and p-nitrobenzenesulfonyl chloride are combined, and the product, methylenecyclopropanemethyl p-nitrobenzenesulfonate, is recrystallized from a chlorofrom-benzene mixture in a yield of 62.5%, M.P. 143–145° C.

Others may practice the invention in any of the numerous ways which will be suggested by this disclosure to one skilled in the art. All such practice of the invention is considered to be a part hereof provided it falls within the scope of the appended claims.

We claim:
1. A compound represented by:

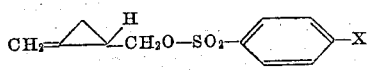

Where X is selected from the class consisting of lower-alkyl, nitro and bromine.

2. Methylenecyclopropanemethyl p-toluenesulfonate.

3. Methylenecyclopropanemethyl p-bromobenzenesulfonate.

4. Methylenecyclopropanemethyl p-nitrobenzenesulfonate.

References Cited in the file of this patent

Bergstrom et al.: J.A.C.S., vol. 74, (1952), page 147.
Roberts et al.: Chem. Abs. page 3506, vol. 46 (1952).
Bergstrom et al.: Chem. Abs. page 5362, vol. 47 (1953).